United States Patent
Lee et al.

(10) Patent No.: US 10,530,827 B2
(45) Date of Patent: Jan. 7, 2020

(54) ACCELERATOR CONTROL METHOD AND ACCELERATOR USING THE SAME

(71) Applicant: SAMSUNG ELECTRONICS CO., LTD., Suwon-si (KR)

(72) Inventors: Sung-ho Lee, Suwon-si (KR); Kil-jong Kim, Suwon-si (KR); Do-young Joung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 319 days.

(21) Appl. No.: 15/193,352

(22) Filed: Jun. 27, 2016

(65) Prior Publication Data

US 2016/0381100 A1 Dec. 29, 2016

(30) Foreign Application Priority Data

Jun. 25, 2015 (KR) .......................... 10-2015-0090496

(51) Int. Cl.
*H04L 29/06* (2006.01)

(52) U.S. Cl.
CPC .......... *H04L 65/607* (2013.01); *H04L 65/608* (2013.01)

(58) Field of Classification Search
CPC ................................................. H04L 65/4069
See application file for complete search history.

(56) References Cited

U.S. PATENT DOCUMENTS

| 8,060,637 | B2 | 11/2011 | Kayanuma et al. |
| 8,762,351 | B2 | 6/2014 | Pantos et al. |
| 9,380,096 | B2 | 6/2016 | Luby et al. |
| 2009/0249222 | A1 | 10/2009 | Schmidt et al. |
| 2012/0179701 | A1* | 7/2012 | Arrouye ............ G06F 17/30067 707/758 |
| 2014/0281002 | A1 | 9/2014 | Sun |
| 2014/0365556 | A1 | 12/2014 | Rehan et al. |
| 2015/0023404 | A1* | 1/2015 | Li ........................ H04L 65/4084 375/240.02 |
| 2015/0106578 | A1* | 4/2015 | Warfield ............... G06F 3/0613 711/158 |

(Continued)

FOREIGN PATENT DOCUMENTS

| KR | 10-2008-0063200 A | 7/2008 |
| KR | 10-2008-0078172 A | 8/2008 |

(Continued)

OTHER PUBLICATIONS

Communication dated Sep. 12, 2016, issued by the International Searching Authority in counterpart International Application No. PCT/KR2016/006645 (PCT/ISA/220, 210, & 237).

*Primary Examiner* — Nicholas P Celani
(74) *Attorney, Agent, or Firm* — Sughrue Mion, PLLC

(57) ABSTRACT

A method of controlling an accelerator for transmitting media content received from a media server to at least one media player, includes receiving from the at least one media player a request for the media content; determining an operational state of the at least one media player; determining a plurality of priorities corresponding to a plurality of pieces of media metadata stored in the accelerator based on the determined operational state, the plurality of pieces of media metadata corresponding to the requested media content; and managing the plurality of pieces of media metadata based on the plurality of priorities.

18 Claims, 10 Drawing Sheets

(56) References Cited

U.S. PATENT DOCUMENTS

2015/0143400 A1* 5/2015 Stokes .................. H04H 60/32
    725/19
2015/0243329 A1* 8/2015 Hadorn ............ H04N 21/44209
    386/230

FOREIGN PATENT DOCUMENTS

| KR | 10-2015-0003296 A | 1/2015 |
| WO | 2015035328 A1 | 3/2015 |

* cited by examiner master.m3u8
EXTM3U
EXT-X-STREAM-INF:PROGRAM-ID=1,BANDWIDTH=1300000
http://10.251.72.51/slave/slave_1300k.m3u8
EXT-X-STREAM-INF:PROGRAM-ID=2,BANDWIDTH=2600000
http://10.251.72.51/slave/slave_2600k.m3u8 slave_1300k.m3u8
EXTM3U
EXT-X-TARGETDURATION:10
EXTINF:10,
http://10.251.72.51/slave/slave_1300k-1.ts
EXTINF:10,
http://10.251.72.51/slave/slave_1300k-2.ts
EXTINF:10,
http://10.251.72.51/slave/slave_1300k-3.ts
EXTINF:10,
http://10.251.72.51/slave/slave_1300k-4.ts
EXTINF:10,
http://10.251.72.51/slave/slave_1300k-5.ts
EXT-X-ENDLIST <Player State Machine Table>

| Group | as | CSRT | LSRT | Group Id | Last Session | Pause |
|---|---|---|---|---|---|---|
| Error | Error | 0 | 1 | 00 | | |
| Idle | Idle | 0 | 0 | 01 | | |
| Stable Group | Play/Resume | 1 | 0 | 10 | 0 | 0 |
| | Pause | 1 | 0 | 10 | 1 | 0 |
| | Stop | 1 | 0 | 10 | 1 | 1 |
| Metastable Group | Play/Resume | 1 | 1 | 11 | 0 | 0 |
| | Pause | 1 | 1 | 11 | 1 | 0 |
| | Stop | 1 | 1 | 11 | 1 | 1 |

FIG. 6

$$D_{pause} = \frac{Time_{current} - CSRT_{previous}}{k * Duration_{n-1}} \quad \cdots \quad (1)$$

where, $k > 2$ $$Pause(D_{pause}) = \begin{cases} 0, & 0 < D_{pause} \leq 1 \\ 1, & D_{pause} > 1 \end{cases} \quad \cdots \quad (2)$$

| Current Time = 10:00:00, K = 3, Duration = 10s ||||||||
|---|---|---|---|---|---|---|
| Content | CSRT | LSRT | CSRT$_{previous}$ | Last Session | $D_{pause}$ | State |
| A | True | False | 9:59:52 | False | $\frac{8}{30}$ | 1000 Stable/Play |
| B | True | False | 9:58:00 | True | $\frac{120}{30}$ | 1011 Stable/Pause |
| C | True | True | 9:55:00 | False | $\frac{300}{30}$ | 1101 Metastable/Stop |
| D | True | False | 9:57:00 | False | $\frac{180}{30}$ | 1001 Stable/Stop |

FIG. 7

$$Score_{play\_bucket} = k + Group_{Id} + \frac{Remain\ Duration}{Total\ Duration} \quad \cdots \quad (1)$$

$$Score_{stop\_bucket} = Group_{Id} + \frac{Remain\ Duration}{Total\ Duration} \quad \cdots \quad (2)$$

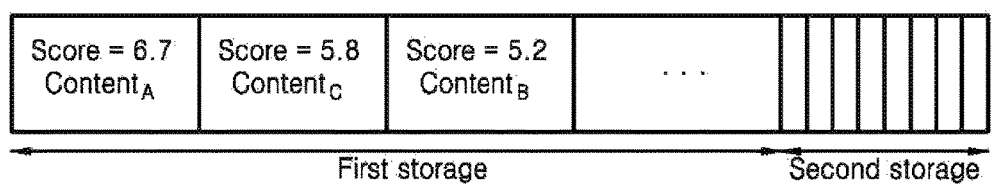

ACCELERATOR CONTROL METHOD AND ACCELERATOR USING THE SAME

CROSS-REFERENCE TO RELATED APPLICATION

This application claims benefit from Korean Patent Application No. 10-2015-0090496, filed on Jun. 25, 2015, in the Korean Intellectual Property Office, the disclosure of which is incorporated herein in its entirety by reference.

BACKGROUND

1. Field

Exemplary embodiments of the present disclosure relate to an accelerator control method and an accelerator using the same.

2. Description of Related Art

The Internet, a human centered connectivity network where humans generate and consume information, is now evolving to the Internet of Things (IoT) in which distributed entities exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value for human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

HTTP Adaptive Streaming is a technique used to request media segments encoded at multiple bit rates on the basis of network conditions in order to provide a streaming service. HTTP Live Streaming (HLS), Smooth Streaming (SS), Dynamic Adaptive Streaming over HTTP (DASH), etc., are representative HTTP adaptive streaming methods.

In HPPT Adaptive Streaming, an accelerator for minimizing buffering and playing high-definition media is provided between a media player and a server that provides media segments.

SUMMARY

Provided are an accelerator control method that manages media metadata requested by a media player on the basis of an operational state of the media player, and an accelerator using the same. However, the technical objects of exemplary embodiments of the present disclosure are not limited to the aforesaid, and other technical objects should be obvious to those skilled in the art from the following exemplary embodiments.

Additional aspects will be set forth in part in the description which follows and, in part, will be apparent from the description, or may be learned by practice of the presented exemplary embodiments.

According to an aspect of an exemplary embodiment, a method of controlling an accelerator for transmitting media content received from a media server to at least one media player, the method may include receiving from the at least one media player a request for the media content; determining an operational state of the at least one media player; determining a plurality of priorities corresponding to a plurality of pieces of media metadata stored in the accelerator based on the determined operational state, the plurality of pieces of media metadata corresponding to the requested media content; and managing the plurality of pieces of media metadata based on the plurality of priorities.

The determining of the operational state may include determining the operational state based on a pattern of requests from the at least one media player for media segments constituting the media content.

The managing may include: aligning the plurality of pieces of media metadata according to the plurality of priorities; and compressing and storing low-priority pieces of media metadata from among the plurality of pieces of media metadata. the low-priority pieces of media metadata corresponding to relatively low priorities from among the plurality of priorities.

The managing may include: aligning the plurality of pieces of media metadata according to the plurality of priorities; and compressing and storing pieces of media metadata associated with a "stopped" operational state of the at least one media player from among the plurality of pieces of media metadata.

The managing may include: aligning the plurality of pieces of media metadata according to the plurality of priorities; and compressing and storing low-priority pieces of media metadata from among the plurality of pieces of media metadata, the low-priority pieces of media metadata corresponding to priorities equal to or less than a predetermined criterion from among the plurality of priorities.

The managing may include: aligning the plurality of pieces of media metadata according to the plurality of priorities; and storing high-priority pieces of media metadata in a first storage and compressing and storing remaining pieces of media metadata in a second storage, the high-priority pieces of media metadata corresponding to high priorities from among the plurality of priorities, and the remaining pieces of media metadata corresponding to low priorities from among the plurality of priorities.

The managing may include requesting a piece of media metadata from the first storage, and subsequently requesting a piece of media metadata from the second storage.

The managing may include, when a storage in which the plurality of pieces of media metadata is stored has insufficient free space to add new pieces of media metadata, deleting low-priority pieces of media metadata from among the plurality of pieces of media metadata, the low-priority pieces of media metadata corresponding to relatively low priorities from among the plurality of priorities.

The method may further include requesting the deleted low-priority pieces of media metadata from the media server when the at least one media player requests a media content associated with the deleted low-priority pieces of media metadata.

The determining of the plurality of priorities may include determining the plurality of priorities based on the operational state of the media player and a progress of a media segment that is currently requested by the media player.

According to another aspect of an exemplary embodiment, a non-transitory computer-readable recording medium may have recorded thereon a computer program which, when executed by a processor, causes the processor to perform any of the methods described herein.

According to a further aspect of an exemplary embodiment, an accelerator for transmitting media content received from a media server to at least one media player includes a processor configured to receive from the at least one media player a request for the media content, determine an operational state of the at least one media player; determine a plurality of priorities corresponding to a plurality of pieces of media metadata stored in the accelerator based on the determined operational state, the plurality of pieces of media metadata corresponding to the requested media content, and manage the plurality of pieces of media metadata based on the plurality of priorities.

The processor may be further configured to determine the operational state based on a pattern of requests from the at least one media player for media segments constituting the media content.

The processor may be further configured to align the plurality of pieces of media metadata according to the plurality of priorities, and compress and store low-priority pieces of media metadata from among the plurality of pieces of media metadata, the low-priority pieces of media metadata corresponding to relatively low priorities from among the plurality of priorities.

The processor may be further configured to align the plurality of pieces of media metadata according to the plurality of priorities, and compress and store pieces of media metadata associated with a "stopped" operational state of the at least one media player from among the plurality of pieces of media metadata.

The processor may be further configured to align the plurality of pieces of media metadata according to the plurality of priorities; and compress and store low-priority pieces of media metadata from among the plurality of pieces of media metadata, the low-priority pieces of media metadata corresponding to priorities equal to or less than a predetermined criterion from among the plurality of priorities.

The accelerator may further include a storage divided into a first storage and a second storage and configured to store media metadata requested by the at least one media player, and the processor may be further configured to align the plurality of pieces of media metadata according to the plurality of priorities, store high-priority pieces of metadata in the first storage, and compress and store remaining media metadata in the second storage, the high-priority pieces of media metadata corresponding to high priorities from among the plurality of priorities, and the remaining pieces of media metadata corresponding to low priorities from among the plurality of priorities.

The accelerator may further include a storage configured to store the plurality of pieces of media metadata, and when the storage has insufficient free space and new media metadata is received, the processor may be further configured to delete low-priority pieces of media metadata from among the plurality of pieces of media metadata, the low-priority pieces of media metadata corresponding to relatively low priorities from among the plurality of priorities.

When the at least one media player requests a media content associated with the deleted low-priority pieces of media metadata, the processor may be further configured to request the deleted low-priority pieces of media metadata from the media server.

The processor may be further configured to determine the plurality of priorities based on the operational state of the media player and a progress of a media segment that is currently requested by the media player.

BRIEF DESCRIPTION OF THE DRAWINGS

These and/or other aspects will become apparent and more readily appreciated from the following description of the embodiments, taken in conjunction with the accompanying drawings in which:

FIG. 6 is a diagram showing a detailed example in which an operational state of a media player is checked, according to an exemplary embodiment;

FIG. 7 is a diagram for describing a scheme of determining a priority on the basis of an operational state of a media player and a scheme of storing media metadata on the basis of priority, according to an exemplary embodiment.

DETAILED DESCRIPTION

Figure 1:
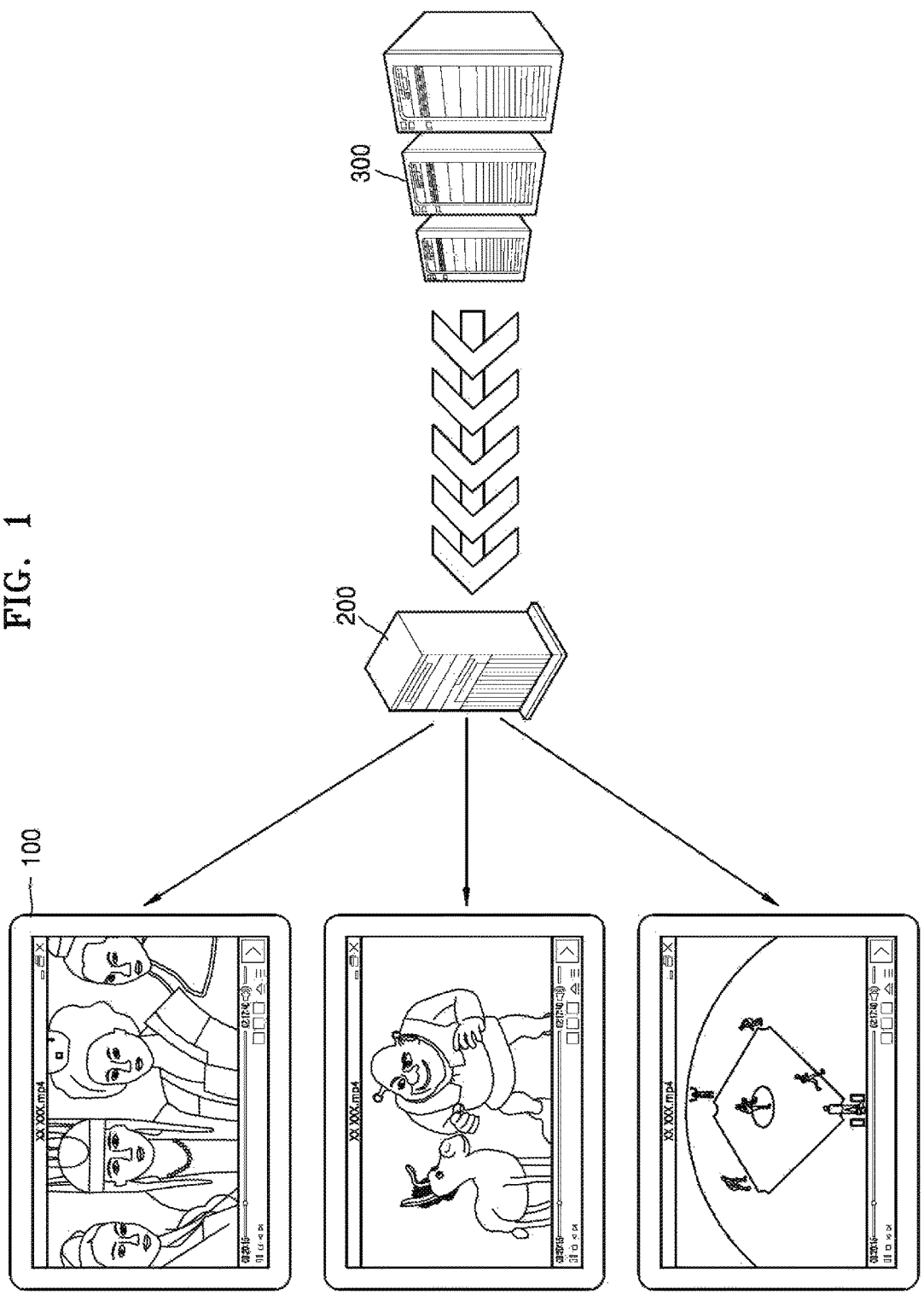
FIG. 1 is a diagram for describing a media system including a media player, an accelerator, and a media server, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and are not to be construed as being limited to the descriptions set forth herein. Accordingly, exemplary embodiments are merely described below by referring to the figures to explain aspects. As used herein, the term "and/or" includes any and all combinations of one or more of the associated listed items. Expressions such as "at least one of," when preceding a list of elements, modify the entire list of elements and do not modify the individual elements of the list.

In this application, the terms "comprising" and "including" are not to be construed to necessarily include all of the elements or steps disclosed herein, and may not include some of the elements or steps thereof or may further include additional elements or steps.

Although the terms first, second, etc., may be used herein to describe various elements, these elements are not limited by these terms. The above terms are used only to distinguish one component from another.

Exemplary embodiments of the present disclosure relate to an accelerator control method and an accelerator using the same. What is well known to those skilled in the art will not be described in detail herein.

FIG. 1 is a diagram for describing a media system including a media player, an accelerator, and a media server, according to an exemplary embodiment.

Referring to FIG. 1, a media system may include a media player 100 configured to request and play media content, a media server 300 configured to provide media content, and an accelerator 200 connected between the media player 100 and the media server 300 and configured to provide high-definition media content.

When a media content request signal is received from the media player 100, the accelerator 200 may request and receive media metadata for media content corresponding to the media content request signal from the media server 300. The accelerator 200 may transmit the media metadata received from the media server 300 to the media player 100 in response to the media content request. In this case, the accelerator 200 may store and manage the media metadata transmitted to the media player 100 in a certain space.

The media content may be played by executing a media stream including at least one media segment. The media metadata may include information regarding each media segment included in the media stream. The media player 100 may play media content corresponding to each media segment using the media metadata.

Figures 2, 3:
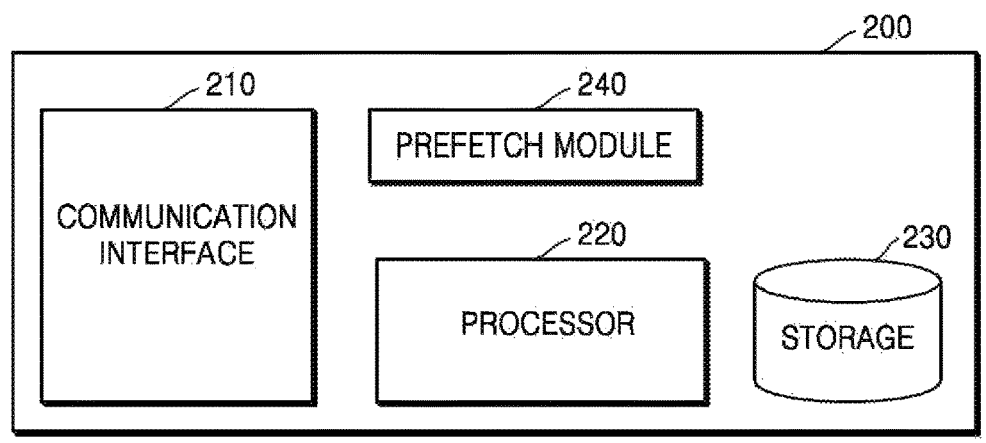
FIG. 2 is a diagram for describing an example of media metadata, according to an exemplary embodiment.
FIG. 3 is a block diagram for describing a configuration of an accelerator according to an exemplary embodiment.

FIG. 2 is a diagram for describing an example of media metadata, according to an exemplary embodiment.

Referring to FIG. 2, there is shown a portion of media metadata corresponding to an example. The media metadata may have a hierarchical structure. As shown in FIG. 2, "master.m3u8" may support media content having different bandwidths and resolutions. When media content corresponding to "http://10.251.72.51/slave/slave_1300k.m3u8" is requested, a request to execute media segments of a media stream file corresponding to the media content may be generated.

It can be seen from FIG. 2 that "http://10.251.72.51/slave/slave_1300k.m3u8" has address information corresponding to five media segments, each of which has a 10 second duration.

When the media player supports HTTP Adaptive Streaming, the media player may play media content using a media stream file encoded at multiple bit rates and a media metadata file having information regarding the media stream.

FIG. 3 is a block diagram for describing a configuration of an accelerator according to an exemplary embodiment.

Referring to FIG. 3, the accelerator 200 may include a communication interface 210, a processor 220, a storage 230, and a prefetch module 240.

The communication interface 210 may communicate with an external device. The accelerator 200 may receive or transmit information from or to the external device through the communication interface 210.

The communication interface 210 may function as a proxy server. For example, when a task of providing high-definition media content and minimizing buffering is performed by the accelerator 200, the communication interface 210 may communicate as a proxy server with the media player 100 or the media server 300. The communication interface 210 may receive a media content request signal from the media player 100. Here, the media content request signal may be a request of media metadata for desired media content. The communication interface 210 may request and receive the media metadata from the media server 300. The communication interface 210 may transmit the media metadata received from the media server 300 to the media player 100.

The processor 220 may perform a task of providing the high-definition media content and minimizing buffering. The processor 220 may efficiently manage the media metadata received by the accelerator 200 such that the high-definition media content may be provided even though limited resources of the accelerator 200 are used.

In some exemplary embodiments, the processor 220 may determine an operational state of at least one media player 100. The processor 220 may determine a priority of the media metadata stored in the accelerator 200 on the basis of the determined operational state. The processor 220 may manage the media metadata requested by the at least one media player 100 on the basis of priority. In this case, the media metadata requested by the at least one media player 100 may include the media metadata received by the accelerator 200 from the media server 300.

The processor 220 may store or delete the media metadata on the basis of priority and may request the media metadata in consideration of priority. For example, when the processor 220 stores the media metadata requested by the at least one media player 100, the processor 220 may store the media metadata on the basis of priority. Also, when the storage 230 in which the media metadata requested by the at least one media player 100 is stored has insufficient free space and new media metadata is received, the processor 220 may delete media metadata having a lower priority first. When information regarding the media segment requested by the media player 100 is included in the deleted media metadata, the processor 220 may request the deleted media metadata from the media server 300 again.

In some exemplary embodiments, processor 220 may be an integrated module, and may be configured to have separate functional modules. For example, there may be a module responsible for storing or deleting the media metadata in or from the storage 230, a module responsible for requesting the media metadata from the media server 300 when the metadata is not stored in the storage 230, etc.

The storage 230 may store the media metadata requested by the at least one media player 100. The media metadata stored in the storage 230 may be managed by the processor 220.

The prefetch module 240 may request a media segment subsequent to a media segment that is being played by the media player 100. In this case, the prefetch module 240 may receive information regarding a media segment to be loaded through the processor 220 in advance. The prefetch module 240 may request a media segment according to network conditions. The prefetch module 240 may be implemented as a separate module independent of the processor 220 as shown in FIG. 3, and may also be integrated into the processor 220.

Because the storage 230 in which the media metadata is stored has limited resources, in some exemplary embodiments the storage 230 cannot continuously store all media metadata requested by the media player 100. Accordingly, management of the media metadata may be performed by the processor 220. This will be described in detail below.

Figure 4:
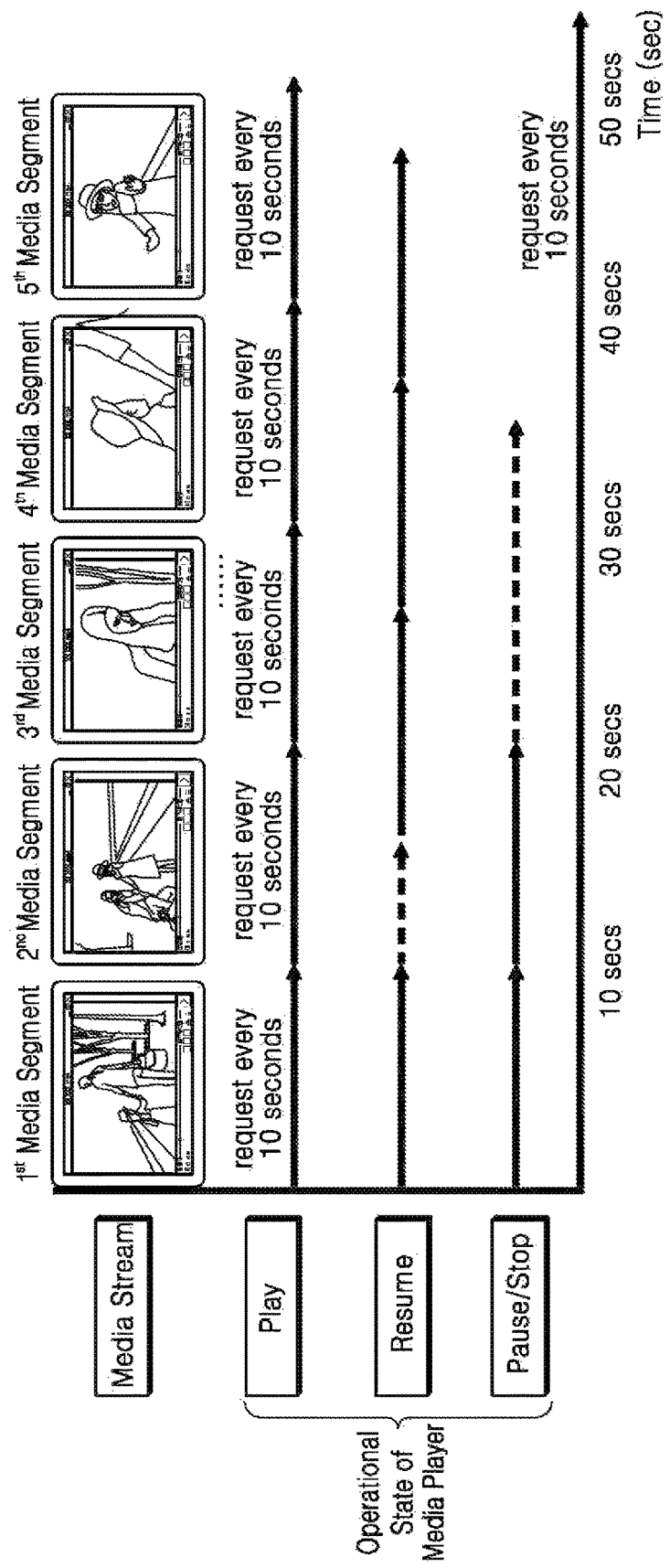
FIG. 4 is a diagram for describing an example in which an operational state of a media player is determined on the basis of a pattern in which media segments are requested, according to an exemplary embodiment.

FIG. 4 is a diagram for describing an example in which an operational state of a media player is determined on the basis of a pattern in which media segments are requested, according to an exemplary embodiment.

The processor 220 may efficiently manage the media metadata received by the accelerator 200 according to a metadata management algorithm such that high-definition media content may be provided without being buffered.

According to a metadata management algorithm according to an exemplary embodiment of the present disclosure, the processor 220 may determine an operational state of at least one media player 100 and manage metadata on the basis of the operational state. When the storage 230 has insufficient free space and new media metadata is received from the media server 300, the processor 220 may delete existing media metadata that has been stored in the storage 230 in order to store the new media metadata. In this case, when the processor 220 performs a deletion in the order in which metadata was stored in the storage 230, that is, when older media metadata is deleted earlier according to a first in first out (FIFO) method, media metadata may be deleted irrespective of a request of a media player 100 that is currently being used. Thus, it may be difficult to efficiently manage the metadata.

The processor 220 according to an exemplary embodiment of the present disclosure may determine an operational state of the media player 100 and may determine a priority of the media metadata stored in the accelerator 200 on the basis of the determined operational state. The processor 220 may manage the media metadata requested by at least one media player 100 on the basis of priority. In this case, the media metadata requested by the at least one media player 100 may include media metadata stored in the accelerator 200 as well as the media metadata that is currently requested.

Referring to FIG. 4, the operational state of the media player 100 may be estimated according to a pattern in which media segments are requested by the media player 100 upon the execution of media content. In the example of FIG. 4, each media segment has a 10 second duration.

When media segments are requested by the media player 100 sequentially every 10 seconds, it may be estimated that the media content is being played by the media player 100. Also, when a media segment is requested by the media player 100 again in a short time and subsequent media segments are requested sequentially every 10 seconds this may mean that the media player 100 performs an operation such as "resume." When no media segment is requested for a certain period of time, this may mean that the play is stopped by the media player 100. Thus, it may be estimated that the play of the media content is paused or stopped.

In this way, the processor 220 may determine the operational state of the at least one media player 100 on the basis of the pattern in which the at least one media player 100 requests media segments constituting the media content.

Figure 5:
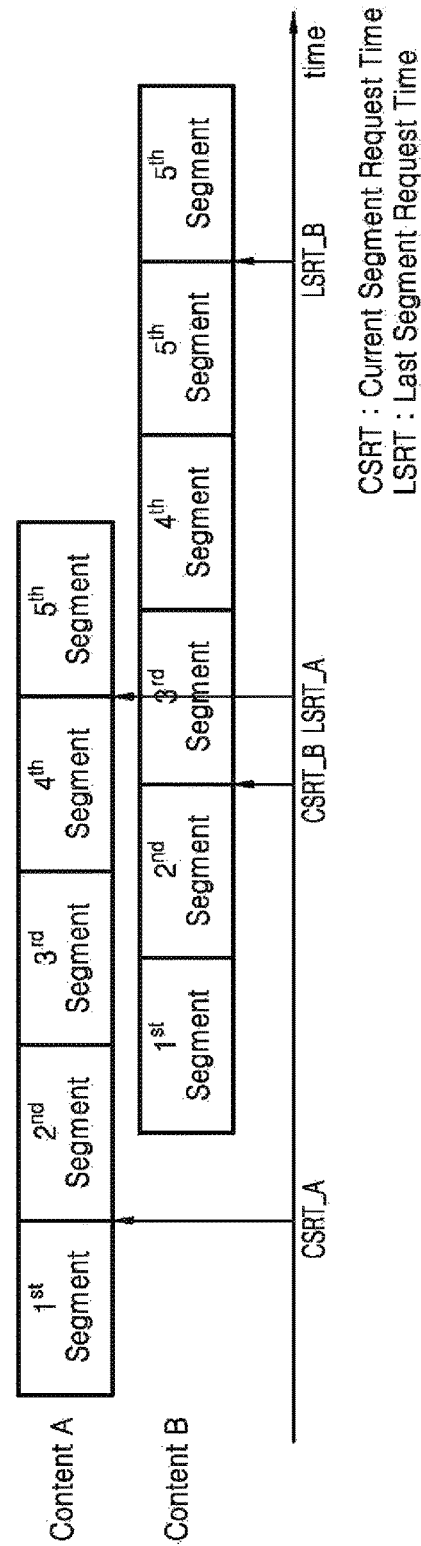
FIG. 5 is a diagram for describing an operational state of a media player and a parameter for determining the operational state of the media player.

FIG. 5 is a diagram for describing an operational state of a media player and a parameter for determining the operational state of the media player.

Referring to FIG. 5, it can be seen that the operational state of the media player 100 may be determined according to parameters of Current Segment Request Time (CSRT), Last Segment Request Time (LSRT), Last Session, and Pause.

Here, CSRT denotes whether there is a time at which the current media segment is requested, and LSRT denotes whether there is a time at which the last media segment is requested. As shown in the figure below the table, CSRT_A indicates a time at which the current media segment of content A is requested, and LSRT_A indicates a time at which the last media segment of content A is requested. Likewise, CSRT_B indicates a time at which the current media segment of content B is requested, and LSRT_B indicates a time at which the last media segment of content B is requested. In this case, both of the CSRT and LSRT may be 1 in the above table.

Last Session denotes whether a last session connection is maintained between the media player 100 and the accelerator 200. Pause denotes whether there is a pause.

For example, when CSRT=T, LSRT='0', Last Session='1', and Pause='1,' it may be determined that the media player 100 is stopped and is not playing any media content because the current media segment is requested, the last media segment is not requested, the last session is maintained between the media player 100 and the accelerator, and there is a pause.

When the operational state of the media player 100 is determined according to the parameters in this way, the result may be classified into four groups. First, when CSRT='0' and LSRT='1,' the current media segment is not requested but the last media segment is requested. This case is contradictory, and thus may be referred to as an error state or an error group. When CSRT='0' and LSRT='0,' the current media segment is not requested and the last media segment is also not requested. This case may be referred to as an idle state or an idle group in which no operation is performed yet. When CSRT='1' and LSRT='0,' the current media segment is requested but the last media segment is not requested. This case may be referred to as a stable group. When CSRT='1' and LSRT='1,' the current media segment is requested, and the last media segment is requested. This case may be referred to as a metastable group. Group IDs of 0 to 3 (corresponding to binary values 00, 01, 10, and 11, respectively) may be assigned for the four groups. The group IDs may be used later to determine priority.

FIG. 6 is a diagram showing a detailed example in which an operational state of a media player is checked, according to an exemplary embodiment.

Referring to FIG. 6, when an equation for calculating a value of Pause is given, and values of CSRT, LSRT, $CSRT_{previous}$, Last session, etc. for each piece of media content are given, there is shown the result of checking an operational state of each media player 100 that requests media content. The result in this example depends on the assumption that current Time=10:00:00, constant K=3, and duration=10 seconds.

The calculation of a value of $D_{pause}$ may be performed according to equation (1), and the determination of the value of Pause using the value of $D_{pause}$ is performed according to equation (2). Here, $Time_{current}$ is the current time, and k is a value that is variable depending on the size of a media metadata file. For a media segment having a 10 second duration, it may be determined that k is a value ranging from 3 to 5.

For example, for content B, it can be seen that this case corresponds to the stable group according the table of FIG. 5 because CSRT='True' (True=1) and LSRT='False' (False=0), the last session connection is maintained because Last Session='1,' and the play of the media content is stopped because $D_{pause}$='120/30' according to the equation of FIG. 6, and thus Pause='1.' This is the same as the case in which CSRT='1', LSRT='0', Last Session='1', and Pause='1' from the table of FIG. 5.

As another example, for content D, it can be seen that this case corresponds to the stable group according the table of FIG. 5 because CSRT='True' (True=1) and LSRT='False' (False=0), the last session connection is closed because Last Session='0,' and the play of the media content is stopped because $D_{pause}$='180/30' according to the equation of FIG. 6, and thus Pause='1.' This is the same as the case in which CSRT='1', LSRT='0', Last Session='0', and Pause='1' from the table of FIG. 5.

As described in FIGS. 4 to 6, the accelerator 200 may determine the operational state of the media player 100 on the basis of the pattern in which the media player 100 requests the media segments constituting the media content.

FIG. 7 is a diagram for describing a scheme of determining a priority on the basis of an operational state of a media player and a scheme of storing media metadata on the basis of priority, according to an exemplary embodiment.

The accelerator 200 according to an exemplary embodiment of the present disclosure may determine a priority of the metadata such that a plurality of pieces of media metadata are stored in consideration of importance of the media metadata. The processor 220 of the accelerator 200 according to an exemplary embodiment of the present disclosure may determine the priority on the basis of an operational state of the media player 100 and a progress of a media segment that is currently requested by the media player 100. As the progress of the media segment that is currently requested increases, the priority may decrease. Accordingly, when the priority is determined, the progress of the media segment that is currently requested may be reflected using a value that represents remaining duration divided by total duration.

Referring to FIG. 7, first, a priority may be determined separately when the media player 100 is not stopped (that is, "playing," "resumed," and "paused") and when the media player 100 is stopped (that is, "stopped"). For each case, the priority may be digitalized using equations of FIG. 7. In some exemplary embodiments, equation (1) is used to determine the priority when the operational state of the media player 100 is not "stopped," and equation (2) is used to determine the priority when the operational state of the media player 100 is "stopped."

Here, k is a value that may be variable depending on the size of a media metadata file, and $Group_{id}$ may be a value ranging from 0 to 3 (corresponding to binary values 00, 01, 10, and 11, respectively). In some exemplary embodiments, the $Group_{id}$ of the stable group is 2, and the $Group_{id}$ of the metastable group is 3.

Depending on whether the media metadata is compressed and stored, the storage 230 of the accelerator 200 may be classified into a first storage in which the media metadata is stored without being compressed and a second storage in which the media metadata is compressed and stored. However, the amount of space of the first storage secured in the storage 230 may be determined depending on an operating scheme of the accelerator 200.

Referring to FIG. 7, it can be seen that whether the media metadata is compressed and stored may be determined, and a storage region in the storage 230 may be determined according to the digitalized priority. The media metadata having a high priority may be stored in the first storage without being compressed, and the media metadata having a low priority may be compressed and stored in the second storage.

Various schemes may be applied to a criterion for compressing and then storing the media metadata, or may be applied to a target to be compressed.

When the priority for the media metadata is determined, the processor 220 of the accelerator 200 may align the media metadata in order of priority and may compress and then store a predetermined number of pieces of media metadata having relatively low priorities among the aligned media metadata. For example, when there are 10 pieces of the media metadata, and the media metadata is managed such that 30% of the total media metadata is compressed and then stored, 3 pieces of the media metadata having relatively low priorities may be compressed and then stored in the second storage.

Also, referring to an example equation for determining a priority of FIG. 7, the media metadata in which the operational state of the media player 100 is "stopped" will have a lower priority because k is not added when the priority is found. Thus, the media metadata in which the operational state of the media player is "stopped" among the aligned media metadata may be compressed and stored.

Also, when the priority for the media metadata is determined, the processor 220 of the accelerator 200 may align the media metadata in order of priority and may compress and store media metadata having a priority equal to or less than a predetermined criterion among the aligned media metadata. This may be a scheme by which the media metadata is managed using an absolute criterion rather than relative priorities of the media metadata.

Also, when the priority for the media metadata is determined, the processor 220 of the accelerator 200 may align the media metadata in order of priority, and may store media metadata having a higher priority in the first storage among the aligned media metadata. Then, when the first storage has insufficient free space to store the remaining media metadata, the remaining media metadata may be compressed and stored in the second storage. This may be a scheme by which the media metadata is stored without any change to minimize a buffering time, and the space of the second storage may be utilized only when the space of the first storage is occupied. When a media segment is requested by the media player 100 while media metadata is managed in this way, media metadata corresponding to the requested media segment may be requested in sequence from the first storage to the second storage.

Figure 8:
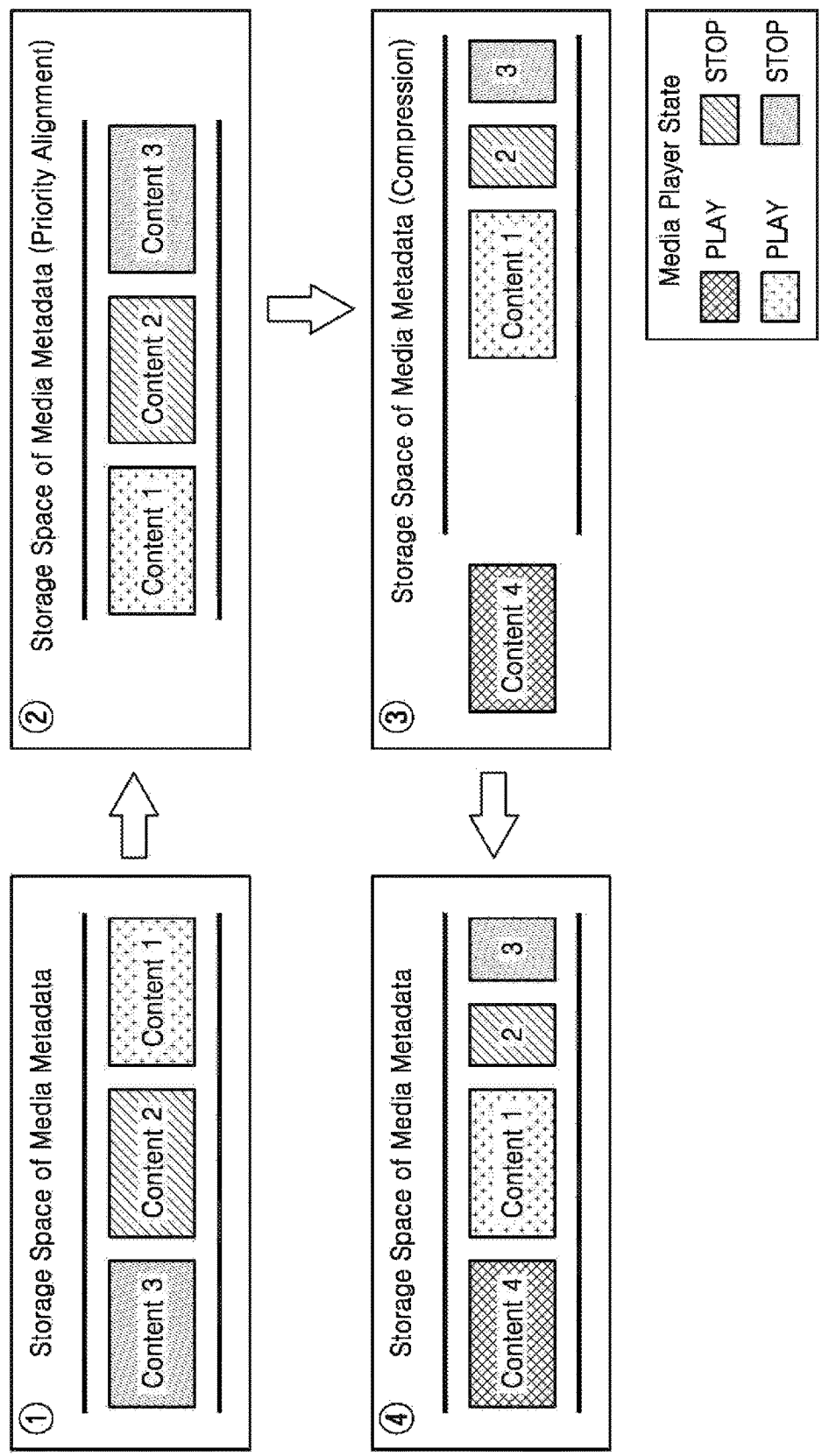
FIG. 8 is a diagram for describing a process of storing media metadata on the basis of priority, according to an exemplary embodiment.

FIG. 8 is a diagram for describing an example process of storing media metadata on the basis of priority, according to an exemplary embodiment.

FIG. 8 shows an example process of managing media metadata in the accelerator 200 when new media content is requested while media metadata corresponding to media content 1, media content 2, and media content 3 is stored in the storage 230 of the accelerator 200. There may be various management algorithms relating to the media metadata. FIG. 8 illustrates a scheme by which media metadata in which an operational state of a media player 100 is "stopped" is compressed and stored.

Referring to FIG. 8, it can be seen from block 1 that media metadata corresponding to media content 1, media content 2, and media content 3 may be stored in a space of the storage 230 of the accelerator 200 in which media metadata is stored. However, there is no space in which the new media metadata may be stored.

Subsequently, when content 4, which is new media content, is requested by the media player 100, the accelerator 200 may provide a storage space by compressing some media metadata according to a predetermined media metadata management scheme in order to secure a space in which media metadata corresponding to media content 4 may be stored.

The accelerator 200 may determine a priority of media metadata on the basis of an operational state of a media player 100 that has requested the media metadata. In this case, a scheme for determining the operational state of the media player 100 described with reference to FIGS. 4 to 6 and a scheme for determining a priority of the media metadata described with reference to FIG. 7 may be used. When the priority of the media metadata is determined, the media metadata may be aligned in order of priority. In block 2 of FIG. 8, it can be seen that the alignment is performed in the order from media metadata of media content 1 having a highest priority to media metadata of media content 3 having a lowest priority. Media content 1 has a high priority because media content 1 is being played by the media player 100, and media content 2 and media content 3 have low priorities because media content 2 and media content 3 are stopped in the media player 100.

Subsequently, the accelerator 200 may compress and then store the media metadata having a low priority in order to secure space needed to store media metadata of media content 4. It can be seen from block 3 of FIG. 8 that the media metadata of media content 2 and the media metadata of media content 3 are compressed and stored, and the media metadata of media content 1 is stored without any change. Since media content 1 is being played in the media player 100, buffering may be minimized by storing, but not compressing, media content 1.

When the storage space for the media metadata is secured in the storage 230 of the accelerator 200, the accelerator 200 may store new media metadata received from the media server 300. It can be seen from block 4 of FIG. 8 that the media metadata of media content 4 is stored in the secured storage space of the storage 230.

Figure 9:
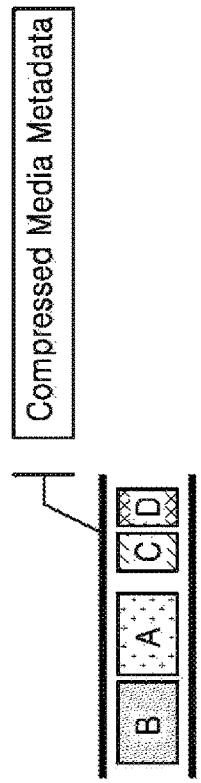
FIG. 9 is a diagram showing a detailed example in which a priority is determined and media metadata is stored on the basis of priority.

FIG. 9 is a diagram showing a detailed example in which a priority is determined and media metadata is stored on the basis of priority, according to an exemplary embodiment.

Referring to FIG. 9, there is shown an example of a scheme by which priorities of media metadata for four pieces of media content from media content A to media content D are determined and stored.

Considering media content A and media content B, it can be seen that an operational state of a media player 100 that has requested the media content is "playing" or "paused." Considering media content C and media content D, it can be seen that an operational state of a media player 100 that has requested the media content is "stopped." As described above, equation (1) described with reference to FIG. 7 is applied when the operational state of the media player 100 is not "stopped," and equation (2) described with reference to FIG. 7 is applied when the operational state of the media player 100 is "stopped."

When equation (1) of FIG. 7 and equation (2) of FIG. 7 are applied using a value given for the media content, it is determined that the media metadata of media content A has a priority of 5.33, the media metadata of media content B has a priority of 5.5, the media metadata of media content C has a priority of 3, and the media metadata of media content D has a priority of 2.33. According to the above priorities, it can be seen that the media metadata of media content B has the highest priority and the media metadata of media content D has the lowest priority.

In an example in which two pieces of media metadata having the two lowest priorities are compressed and stored, and in which media metadata in which an operational state of the media player 100 is "stopped" is compressed and stored, or in an example in which media metadata having a priority equal or less than 4 is compressed and then stored, as shown in FIG. 9, a media metadata management algorithm may compress and store the media metadata of media content C and media content D and may store the media metadata of media content B and media content A without any change.

Figure 10:
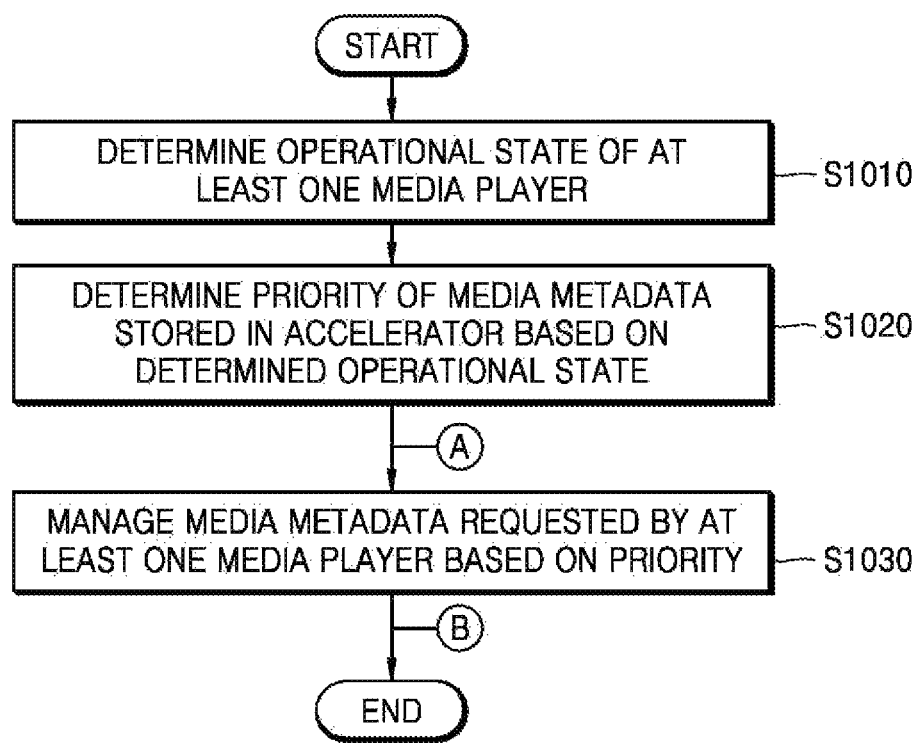
FIG. 10 is a flowchart showing a method of controlling an accelerator according to an exemplary embodiment.

FIG. 10 is a flowchart showing a method of controlling an accelerator according to an exemplary embodiment.

In S1010, the accelerator 200 may determine an operational state of at least one media player 100. In order to minimize buffering and provide high-definition media content, the accelerator 200 may determine the operational state of the media player 100, thus efficiently managing media metadata received by the accelerator 200.

When a media content request signal is received from the at least one media player 100, the accelerator 200 may request and receive media metadata for media content from the media server 300. The accelerator 200 may store the media metadata received from the media server 300 and may also transmit the media metadata for the media content to the media player 100 that has requested the media content. In this case, the accelerator 200 may efficiently manage newly received media metadata and prestored media metadata corresponding to other media content. In an exemplary embodiment of the present disclosure, the accelerator 200 may determine the operational state of the media player 100 and use the operational state. The accelerator 200 may determine the operational state of the at least one media player 100 on the basis of a pattern in which the at least one media player 100 requests media segments constituting the media content.

In S1020, the accelerator 200 may determine a priority of media metadata stored in the accelerator 200 on the basis of the determined operational state. The accelerator 200 may determine the priority on the basis of the operational state of the media player 100 and a progress of a media segment that is currently requested by the media player 100.

In S1030, the accelerator 200 may manage the media metadata requested by the at least one media player 100 on the basis of priority. The accelerator 200 may store or delete the media metadata on the basis of priority and may inquire for the media metadata in consideration of priority. For example, when the accelerator 200 stores the media metadata requested by the at least one media player 100, the accelerator 200 may store the media metadata on the basis of priority. Also, when the storage 230 in which the media metadata requested by the at least one media player 100 is stored has insufficient free space and new media metadata is received, the accelerator 200 may delete media metadata having a lower priority first. When information regarding the media segment requested by the media player 100 is included in the deleted media metadata, the accelerator 200 may request the deleted media metadata from the media server 300 again.

An example of a scheme by which the accelerator 200 manages media metadata according to various algorithms for managing the media metadata will be described below.

Figure 11:
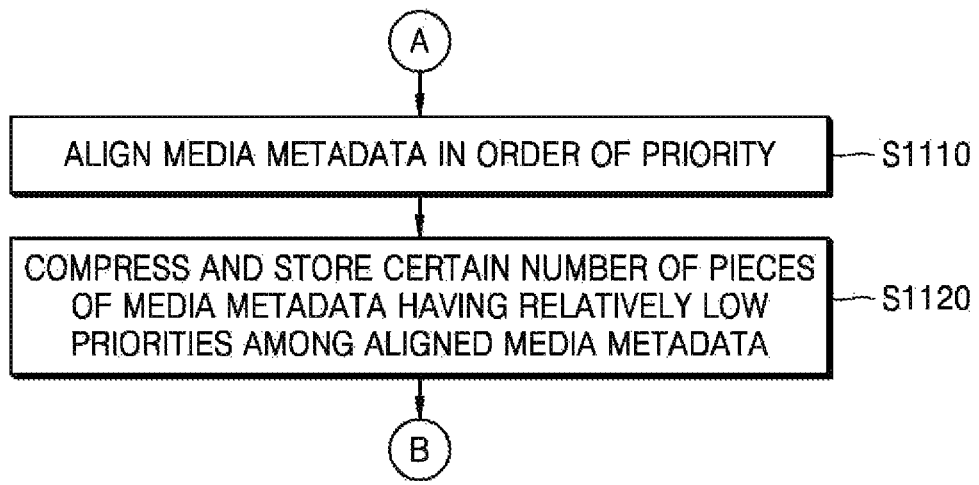
FIG. 11 is a detailed flowchart showing an example in which media metadata is managed on the basis of priority in a method of controlling an accelerator according to an exemplary embodiment.

FIG. 11 is a detailed flowchart showing an example in which media metadata is managed on the basis of priority in a method of controlling an accelerator according to an exemplary embodiment.

In S1110, the accelerator 200 may align media metadata stored in the accelerator 200 in order of priority.

In S1120, the accelerator 200 may compress and store a certain number of pieces of media metadata having relatively low priorities among the aligned media metadata. Here, the certain number may be changed depending on network conditions or hardware resources of the accelerator 200.

Figure 12:
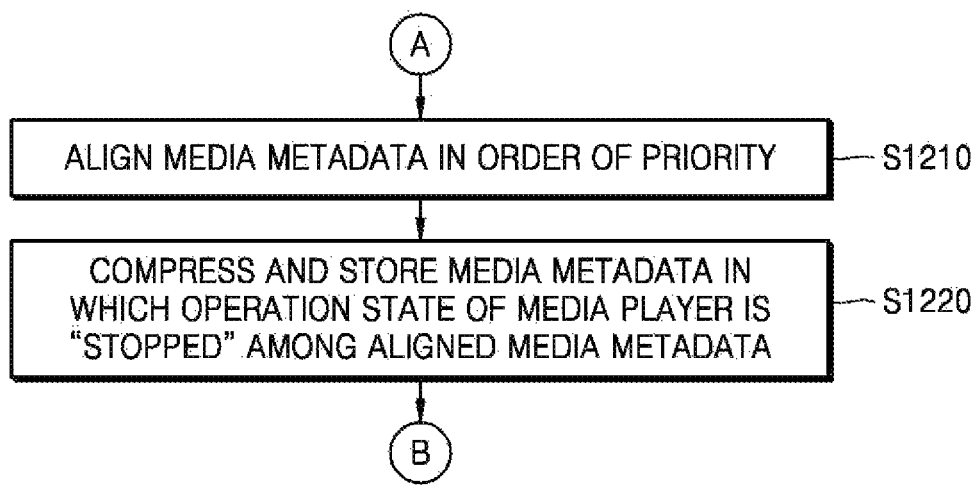
FIG. 12 is a detailed flowchart showing another example in which media metadata is managed on the basis of priority in a method of controlling an accelerator according to an exemplary embodiment.

FIG. 12 is a detailed flowchart showing another example in which media metadata is managed on the basis of priority in a method of controlling an accelerator according to an exemplary embodiment.

In S1210, the accelerator 200 may align media metadata stored in the accelerator 200 in order of priority.

In S1220, the accelerator 200 may compress and store media metadata in which an operational state of a media player 100 is "stopped" among the aligned media metadata. When the storage 230 has insufficient space, media metadata having a lower priority may be deleted first.

Figure 13:
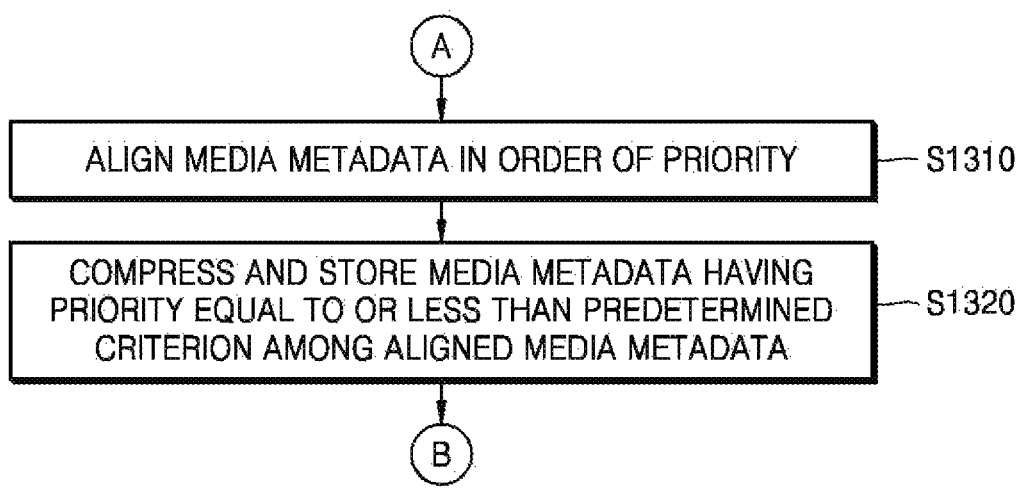
FIG. 13 is a detailed flowchart showing still another example in which media metadata is managed on the basis of priority in a method of controlling an accelerator according to an exemplary embodiment.

FIG. 13 is a detailed flowchart showing still another example in which media metadata is managed on the basis of priority in a method of controlling an accelerator according to an exemplary embodiment.

In S1310, the accelerator 200 may align media metadata stored in the accelerator 200 in order of priority.

In S1320, the accelerator 200 may compress and store media metadata having priorities equal to or less than a predetermined criterion among the aligned media metadata. This may be a scheme by which the media metadata is managed using an absolute criterion rather than relative priorities of the media metadata.

Figure 14:
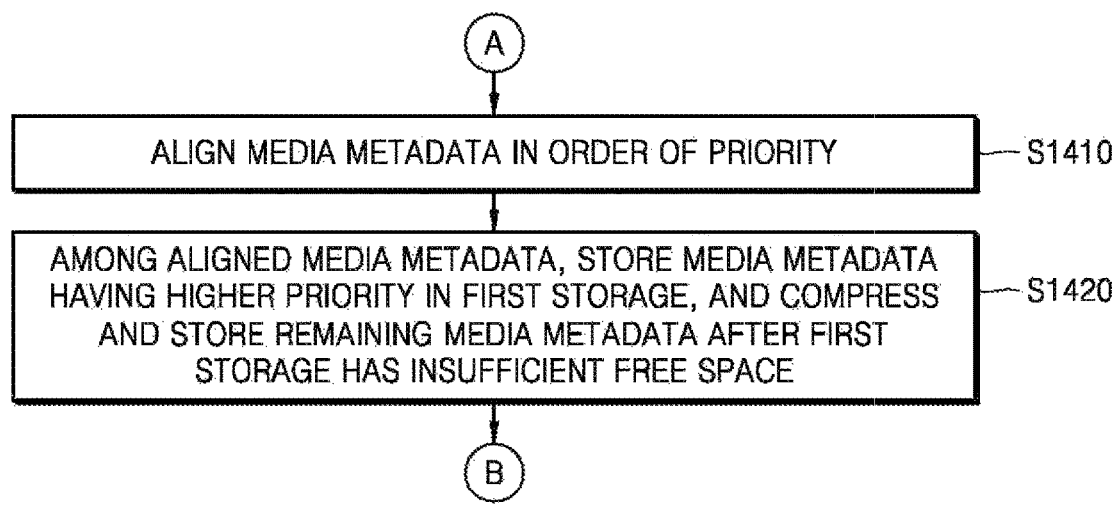
FIG. 14 is a detailed flowchart showing yet another example in which media metadata is managed on the basis of priority in a method of controlling an accelerator according to an exemplary embodiment.

FIG. 14 is a detailed flowchart showing yet another example in which media metadata is managed on the basis of priority in a method of controlling an accelerator according to an exemplary embodiment.

In S1410, the accelerator 200 may align media metadata stored in the accelerator 200 in order of priority.

In S1420, the accelerator 200 may store media metadata having a higher priority in a first storage among the aligned media metadata, and may compress and store the remaining media metadata in a second storage after the first storage has insufficient free space. This may be a scheme by which the media metadata is stored without any change to minimize a buffering time, and a space of the second storage is utilized only when a space of the first storage is occupied. When a media segment is requested by the media player 100 while media metadata is managed in this way, media metadata corresponding to the requested media segment may be requested in sequence from the first storage to the second storage.

The method of controlling the accelerator according to an exemplary embodiment of the present disclosure may be written as computer programs and may be implemented in general-purpose digital computers that execute the programs using a computer-readable recording medium. Examples of the computer-readable recording medium may include storage media such as magnetic storage media (e.g., read-only memories (ROMs), floppy disks, hard disks, etc.), optical recording media (e.g., compact disc read-only memories (CD-ROMs), digital versatile discs (DVDs), etc.), etc.

The present disclosure has been particularly shown and described with reference to exemplary embodiments thereof. It should be understood by those skilled in the art that various changes in form and details may be made therein without departing from the spirit and scope of the present disclosure as defined by the appended claims. Therefore, the disclosed exemplary embodiments should be considered in descriptive sense only and not for purposes of limitation. The scope of the present disclosure is defined not by the detailed description of exemplary embodiments but by the appended claims.

What is claimed is:

1. A method of operating an accelerator, the method comprising:

receiving, from at least one media player, at least one request for media contents;

requesting, to a media server, media metadata corresponding to each of the media contents;

receiving, from the media server, the media metadata;

determining an operational state of the at least one media player;

determining a priority for each of the received media metadata based on the operational state, wherein the determining of the priority comprises:

assigning a high priority to first media metadata among the media metadata when an operational state of a media player that requests media contents associated with the first media metadata is a playing operational state, wherein the media contents associated with the first media metadata are played by the media player; and determining a scheme of storing the media metadata based on the determined priority, wherein the high priority indicates higher priority than a low priority assigned to second media metadata corresponding to media contents requested by a media player in a stopped operational state, and wherein the scheme of storing the media metadata comprises:

a first scheme of storing the first media metadata assigned with the high priority, and a second scheme of compressing and storing the second media metadata assigned with the low priority.

2. The method of claim 1, wherein the operational state of the at least one media player is determined based on a pattern in which media segments are requested by the at least one media player upon execution of the media contents.

3. The method of claim 1, wherein the scheme of storing the media metadata comprises aligning the media metadata according to the priority.

4. The method of claim 1, wherein the scheme of storing the media metadata comprises aligning the media metadata according to the priority, and wherein the second media metadata corresponds to a priority equal to or less than a predetermined criterion from among the priority.

5. The method of claim 1, wherein the scheme of storing the media metadata comprises:

aligning the media metadata according to the priority; and storing the first media metadata in a first storage, and compressing and storing the second media metadata in a second storage.

6. The method of claim 5, further comprising:

requesting the first media metadata from the first storage; and subsequently requesting the second media metadata from the second storage.

7. The method of claim 6, further comprising:
when a storage in which the media metadata is stored has insufficient free space to add new pieces of media metadata, deleting the second media metadata from the second storage.

8. The method of claim 7, further comprising:
requesting the deleted second media metadata from the media server when the at least one media player requests a media content associated with the deleted second media metadata.

9. The method of claim 1, wherein the determining of the priority comprises determining the priority based on the operational state of the at least one media player and a progress of a media segment that is currently requested by the at least one media player.

10. A non-transitory computer-readable recording medium having recorded thereon a computer program which, when executed by a processor, causes the processor to perform the method of claim 1.

11. An accelerator comprising;
a communication interface;
a memory; and
a processor configured to:
receive, from at least one media player, at least one request for media contents,
request, to a media server, media metadata corresponding to each of the media contents,
receive, from the media server, the media metadata,
determine an operational state of the at least one media player, and
determine a priority for each of the
received media metadata based on the operational state,
wherein the processor is further configured to:
assign a high priority to first media metadata among the media metadata when an operational state of a media player that requests media contents associated with the first media metadata is a playing operational state, and
determine a scheme of storing the media metadata based on the determined priority,
wherein the media contents associated with the first media metadata are played by the media player,
wherein the high priority indicates higher priority than a low priority assigned to second media metadata corresponding to media contents requested by a media player in a stopped operational state, and
wherein the scheme of storing the media metadata comprises:
a first scheme of storing the first media metadata assigned with the high priority, and
a second scheme of compressing and storing the second media metadata assigned with the low priority.

12. The accelerator of claim 11, wherein the operational state of the at least one media player is determined based on a pattern in which media segments are requested by the at least one media player upon execution of the media contents.

13. The accelerator of claim 11,
wherein the scheme of storing the media metadata comprises aligning the media metadata according to the priority.

14. The accelerator of claim 11,
wherein the scheme of storing the media metadata comprises aligning the media metadata according to the priority, and
wherein the second media metadata corresponds to a priority equal to or less than a predetermined criterion from among the priority.

15. The accelerator of claim 11, further comprising a storage divided into a first storage and a second storage and configured to store the media metadata;
wherein the scheme of storing the media metadata comprises:
aligning the media metadata according to the priority; and
storing the first media metadata in a first storage, and compressing and storing the second media metadata in a second storage.

16. The accelerator of claim 15, further comprising a storage configured to store the media metadata,
wherein, when the storage in which the media metadata is stored has insufficient free space to add new pieces of media metadata, the processor is further configured to delete the second media metadata from the second storage.

17. The accelerator of claim 16,
wherein, when the at least one media player requests a media content associated with the deleted second media metadata, the processor is further configured to request the deleted second media metadata from the media server.

18. The accelerator of claim 11, wherein the processor is further configured to determine the priority based on the operational state of the at least one media player and a progress of a media segment that is currently requested by the at least one media player.

* * * * *